United States Patent
Inaba (10) Patent No.: US 6,751,412 B2
(45) Date of Patent: Jun. 15, 2004

(54) STEREO CAMERA AND STEREO SLIDE MOUNT

(76) Inventor: Minoru Inaba, No. 1116, Oaza Samukawa, Oyama-shi Tochigi-ken (JP)

( * ) Notice: Subject to any disclaimer, the term of this patent is extended or adjusted under 35 U.S.C. 154(b) by 73 days.

(21) Appl. No.: 10/098,839

(22) Filed: Mar. 14, 2002

(65) Prior Publication Data

US 2002/0159771 A1 Oct. 31, 2002

(30) Foreign Application Priority Data

Apr. 26, 2001 (JP) ........................................ 2001-129033

(51) Int. Cl.$^7$ ............................................. G03B 35/00
(52) U.S. Cl. ........................................ 396/324; 352/239
(58) Field of Search .......................... 396/324; 352/57, 352/60, 239, 62–64

(56) References Cited

U.S. PATENT DOCUMENTS

| | | | | |
|---|---|---|---|---|
| 4,942,684 A | * | 7/1990 | Oehmichen | 40/710 |
| 5,576,153 A | * | 11/1996 | Inaba | 430/501 |
| 6,253,031 B1 | * | 6/2001 | Inaba | 396/326 |
| 6,296,360 B1 | * | 10/2001 | Inaba | 353/7 |
| 6,301,446 B1 | * | 10/2001 | Inaba | 396/324 |
| 6,494,580 B2 | * | 12/2002 | Inaba | 353/7 |

FOREIGN PATENT DOCUMENTS

JP 11223929 A * 8/1999 .......... G03D/15/10

* cited by examiner

*Primary Examiner*—David M. Gray
(74) *Attorney, Agent, or Firm*—Fattibene & Fattibene; Paul A. Fattibene; Arthur T. Fattibene (57) ABSTRACT

The present invention provides a stereo camera 22 for photographing a pair of left and right stereo pictures 1L and 1R in the first frame and the third frame of a continuous film 21, photographing the next pair of left and right stereo pictures 2L and 2R in the second frame and the fourth frame thereof, and repeating similar photographing, wherein the perforation positions of the first frame to the fourth frame are arranged so as to be symmetrical about the center in the longitudinal direction of the first frame to the fourth frame as the center of symmetry for performing photographing.

19 Claims, 12 Drawing Sheets

STEREO CAMERA AND STEREO SLIDE MOUNT

BACKGROUND OF THE INVENTION

1. Field of the Invention

The present invention relates to a stereo camera and a stereo slide mount. More specifically, the present invention relates to a stereo camera and a stereo slide mount, in which an extending of frame width of a film is contemplated to efficiently use the film and to decrease a required number of types of film holders, and mounting operation is made easy.

2. Description of the Related Art

This type of stereo camera and stereo slide mount will be described. Commercially available 135-size films packed in cartridges are designed for photographing 36 frames in a 36×24 monaural standard format (using 8 perforations for one frame), in the case of having the longest length, and the total number of perforations of the photographed 36 frames becomes 8×36=288 perforations. In addition, a slight tolerance is provided at the front end and at the rear end in the 135-size film.

On the other hand, as a stereo camera for photographing a pair of left and right stereo pictures in the first frame and the third frame, photographing the next pair of left and right stereo pictures in the second frame and the fourth frame, and repeating similar photographing, there is known one such stereo camera which uses 7 perforations for one frame.

In this stereo camera, it is possible to photograph 288/(7×2)=20.57 sets, that is, 20 sets of stereographs having 7 perforations for one frame in the length corresponding to 288 perforations of the 135-size film. The total number of perforations at the time of photographing 20 sets of stereographs is 14×20=280 perforations, and hence having a tolerance of further 8 perforations.

Therefore, others have enlarged the width of the photographing window of a camera to 33.5 mm, which is slightly larger than 4.735×7=33.145 mm corresponding to 7 perforations, and sets the pitch between the left and right photographing windows to 33.5×2=67 mm. As the feed quantity of the film, after taking pictures for frames of an odd number set, 33.5 mm (33.5/4.735=7.075 perforations) for one frame is fed, and after taking pictures for frames of an even number set, about 21.925 perforations slightly more than 7.075×3=21.225 perforations corresponding to three frames are fed. Therefore, the number of perforations of one group including feeding for four frames becomes 29 perforations.

Moreover, the total number of used perforations at the time of taking pictures for 20 sets frames becomes 29×10=290 perforations, which is two perforations more than the total number of used perforations 8×36=288 at the time of taking 36 pictures for frames in the above-described 36×24 monaural standard format.

Therefore this stereo camera is excellent in that the commercially available 135-size film is effectively used, by extending the frame width to be photographed, but a new problem arises. That is to say, since the frame width corresponding to one frame, the film length at the time of cutting for each one frame, is made to be 33.5 mm, a hole position, which is a perforation of the film with respect to the picture frame, becomes different for each frame, therefore the hole positions are all different for each four frames. That is, films cut for each frame become four types of films having respectively different hole position.

With the stereo slide mount disclosed in U.S. Pat. No. 4,942,664, left and right individual film is optionally positionable, and the position is also adjustable even if the hole position is different for each picture frame. However, it is difficult to adjust accurately.

FIG. 14 shows a stereo slide mount 11 described in Japanese Patent Application No. Hei 11-273315, wherein accurate position adjustment is possible at the time of mounting a stereograph photographed by the stereo camera by the stereo slide mount 11.

Figure 14A:
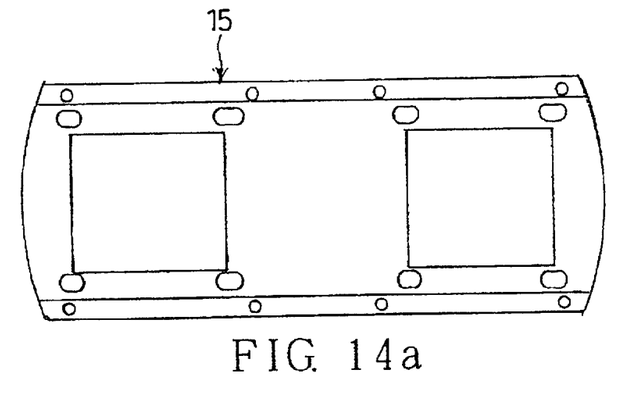
FIG. 14(a) shows a conventional example, and is a bottom view of a cover frame.
Figure 14B:
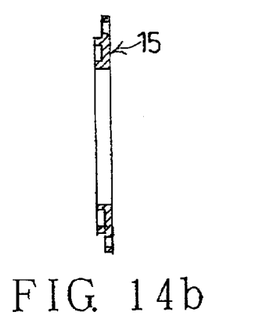
FIG. 14(b) is a cross section of FIG. 14(a)
Figure 14C:
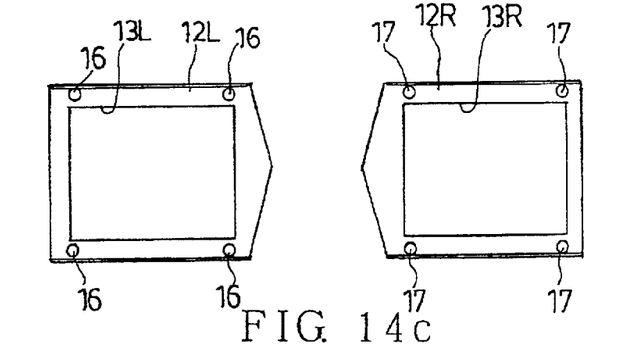
FIG. 14(c) shows a conventional example, and is an elevation view of left and right film holders.
Figure 14D:
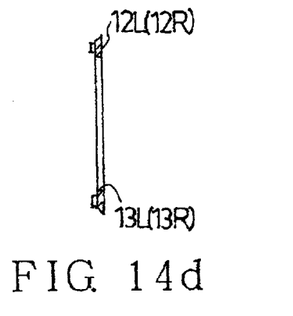
FIG. 14(d) is a cross section of FIG. 14(c)
Figure 14E:
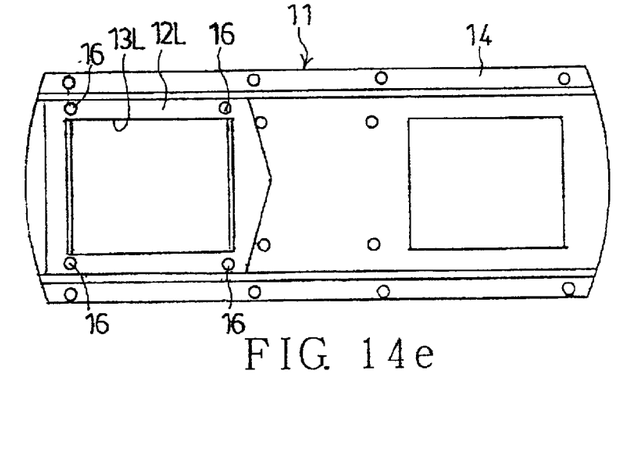
FIG. 14(e) shows a conventional example, and is an elevation view of a stereo slide mount showing a condition with a left film holder being mounted to a base frame.
Figure 14F:
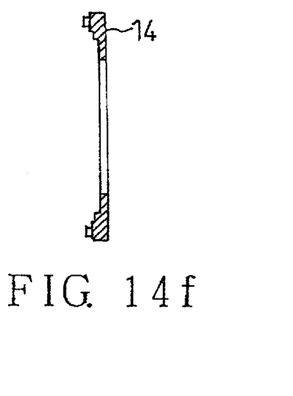
FIG. 14(f) is a cross section of the base frame in FIG. 14(e)

However, in order to use the stereo slide mount 11, it is necessary to latch the film in predetermined positions of the respective film holders 12L and 12R, so that the picture frames of the film coincides with the windows 13L and 13R of the film holders 12L and 12R. In this figure, reference symbol 14 denotes a base frame serving as a base plate of the stereo slide mount 11, and 15 denotes a cover frame adhered to the base frame 14 for slidably fitting the film holders 12L and 12R together.

As described above, films photographed by using this camera become films of four types having different hole positions for each frame. Hence, in order to use the stereo slide mount 11, film holder corresponding to the four types of films, that is, four types of film holders having different positions of pins 16 and 17 for latching those films must be prepared. However, even if four types of film holders are prepared, and used by adding marking for identification, confusion is expected in actual use.

Therefore, it is an object of the present invention to solve the above-described technical problems in the stereo camera and the stereo slide mount, in order to extend the frame width of the film to efficiently use the film and to decrease a required number of types of film holders, and to make mounting operation easy.

SUMMARY OF THE INVENTION

The present invention has been proposed in order to achieve the above object, and provides:

a stereo camera for photographing a pair of left and right stereo pictures in the first frame and the third frame of a continuous film, photographing the next pair of left and right stereo pictures in the second frame and the fourth frame thereof, and repeating similar photographing, wherein the perforation positions of the first frame to the fourth frame are arranged so as to be symmetrical about the center in the longitudinal direction of the first frame to the fourth frame as the center of symmetry for performing photographing;

a stereo camera for photographing a pair of left and right stereo pictures in the first frame and the third frame of a continuous film, photographing the next pair of left and right stereo pictures in the second frame and the fourth frame thereof, and repeating similar photographing, wherein the perforation positions of the first frame to the fourth frame are arranged so as to be symmetrical about the center in the longitudinal direction of the first frame to the fourth frame as the center of symmetry for performing photographing, as well as a mark being recorded for cutting the film at a boundary position between respective frames of the film by a mark recording device;

a stereo camera for photographing a pair of left and right stereo pictures in the first frame and the third frame of a continuous film, photographing the next pair of left and right stereo pictures in the second frame and the fourth frame thereof, and repeating similar photographing, wherein the perforation positions of the first frame to the fourth frame are arranged so as to be symmetrical about the center in the longitudinal direction of the first frame to the fourth frame as the center of symmetry for performing photographing, as well as a frame number for stereo slides being recorded in each frame of the film by a number recording device;

a stereo camera for photographing a pair of left and right stereo pictures in the first frame and the third frame of a continuous film, photographing the next pair of left and right stereo pictures in the second frame and the fourth frame thereof, and repeating similar photographing, wherein the perforation positions of the first frame to the fourth frame are arranged so as to be symmetrical about the center in the longitudinal direction of the first frame to the fourth frame as the center of symmetry for performing photographing, as well as a mark being recorded for cutting the film at a boundary position between respective frames of the film by a mark recording device, and a frame number for stereo slides being recorded in each frame of the film by a number recording device;

a stereo slide mount in which a pair of left and right film holders is slidably fitted together between a base frame and a cover frame respectively having left and right two windows placed in juxtaposition with each other therein, wherein an identification mark for identifying the odd number set and the even number set of the film frame number to be attached to the film holder, and left and right thereof is selectively given to the left and right film holders; and a stereo slide mount in which a pair of left and right film holders is slidably fitted together between a base frame and a cover frame respectively having left and right two windows placed in juxtaposition with each other therein, wherein a pin to be engaged with the perforations of the film in which odd number stereo pictures are photographed is provided in the left and right film holders to thereby prepare left and right film holders for the odd number set, or a pin to be engaged with the perforations of the film in which even number stereo pictures are photographed is provided in the left and right film holders to thereby prepare left and right film holders for the even number set, corresponding to a stereo slide film for photographing a pair of left and right stereo pictures of the odd number in the first frame and the third frame of a continuous film, photographing a pair of left and right stereo pictures of the even number is photographed in the second frame and the fourth frame thereof, and repeating similar photographing, in which the perforation positions of the first frame to the fourth frame are arranged so as to be symmetrical about the center in the longitudinal direction of the first frame to the fourth frame as the center of symmetry, so that the left and right film holders for the odd number set and the left and right film holders for the even number set, respectively provided with the pin, are in a rotational symmetry at 180 degrees, and freely shared.

As described below in one embodiment of the present invention, the invention according to a first aspect is a stereo camera constructed such that the perforation positions of the first frame to the fourth frame are arranged so as to be symmetrical about the center in the longitudinal direction of the first frame to the fourth frame as the center of symmetry for performing photographing. Hence, the films in the odd number frames and the even number frames can be used, sharing the same film holder, thereby enabling reduction in the types of the necessary film holders. Moreover, according to this arrangement, the frame width of the film can be extend, and the film can be effectively used.

The invention according to a second aspect is constructed such that a mark is recorded for cutting the film at a boundary position between respective frames of the film by the mark recording device, and hence cutting of the film can be performed easily, safely and accurately.

The invention according to a third aspect is constructed such that a frame number for stereo slides is recorded in each frame of the film by the number recording device, and hence confirmation of the film frame becomes easy, and the mounting operation becomes also easy.

The invention according to a fourth aspect is constructed such that a mark is recorded for cutting the film at a boundary position between respective frames of the film by the mark recording device, and a frame number for stereo slides is recorded in each frame of the film by the number recording device, and hence the effects of the inventions of the second and the third aspects can be achieved together.

The invention according to a fifth aspect is a stereo slide mount wherein an identification mark for identifying an odd number set and an even number set of the film frame number to be attached to the film holder, and left and right thereof is selectively imparted to the left and right film holders, and hence mounting of the film to the film holder becomes easy by means of the identification mark.

The invention according to a sixth aspect is a stereo slide mount wherein the left and right film holders for the odd number set and the left and right film holders for the even number set, respectively provided with a pin, are in a rotational symmetry at 180 degrees, and can be freely shared. Hence, it becomes possible to reduce the types of necessary film holders, to thereby exhibit significant effects, such as an increase in the benefit and convenience.

PREFERRED EMBODIMENT OF THE INVENTION

Figure 1:
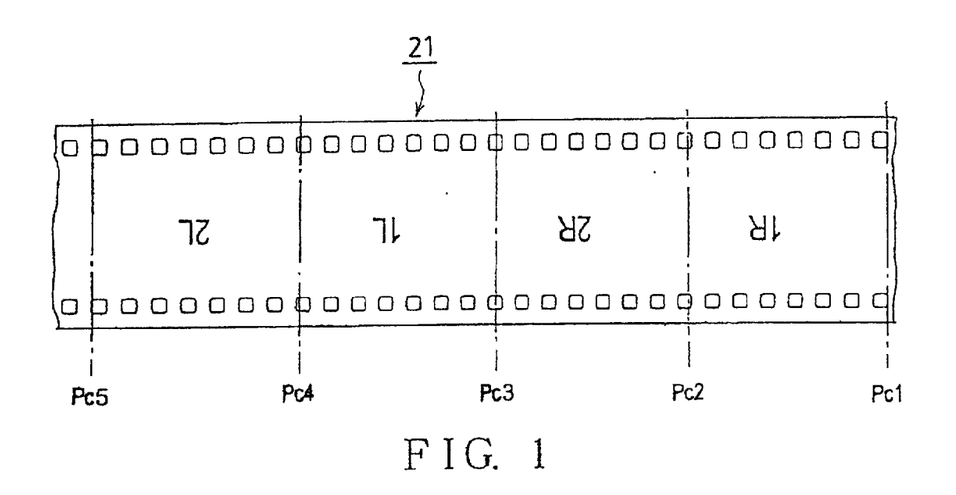
FIG. 1 is an elevation view of a film photographed by a stereo camera, showing one embodiment of the present invention.

One embodiment of the present invention will now be described in detail with reference to FIG. 1 to FIG. 13. In FIG. 1, reference symbol 21 denotes a continuous film, and frame 1R of the first frame of the film 21 and frame 1L of the third frame are photographed at the same time as a pair of left and right frames, and subsequently frame 2R of the second frame and frame 2L of the fourth frame are photographed at the same time as a pair of left and right frames. That is to say, stereographs are taken in the order of picture frame array of frames 1R-2R-1L-2L. Then, the four frames are photographed in a state with the adjacent frames being in contact with each other (gapless) (however, it may not be necessarily gapless), and thereafter, photographing is repeated in the similar picture frame array.

Moreover, the film photographed in the above picture frame array is cut for each frame, as in the invention described in Japanese Patent No. 2957086. After cutting, the hole shape of perforations at the opposite ends of each film is made open, and the above invention is improved to use the film effectively, and the cut positions of the film where the width of each frame is made maximum becomes positions indicated by cutting line marks at five places Pc1, Pc2, Pc3, Pc4 and Pc5 as shown in the figure.

That is to say, the cutting line mark Pc3 located at the center is set to be a center of the hole as a perforation, the cutting line marks Pc1 and Pc5 at the opposite outer ends are set to be the outermost end of the hole, respectively, and the next cutting line marks Pc2 and Pc3 are set to be in the middle between the center of the hole and the outer end, that is, set to a position outside from the center of the hole by the hole width×¼.

Figure 2:
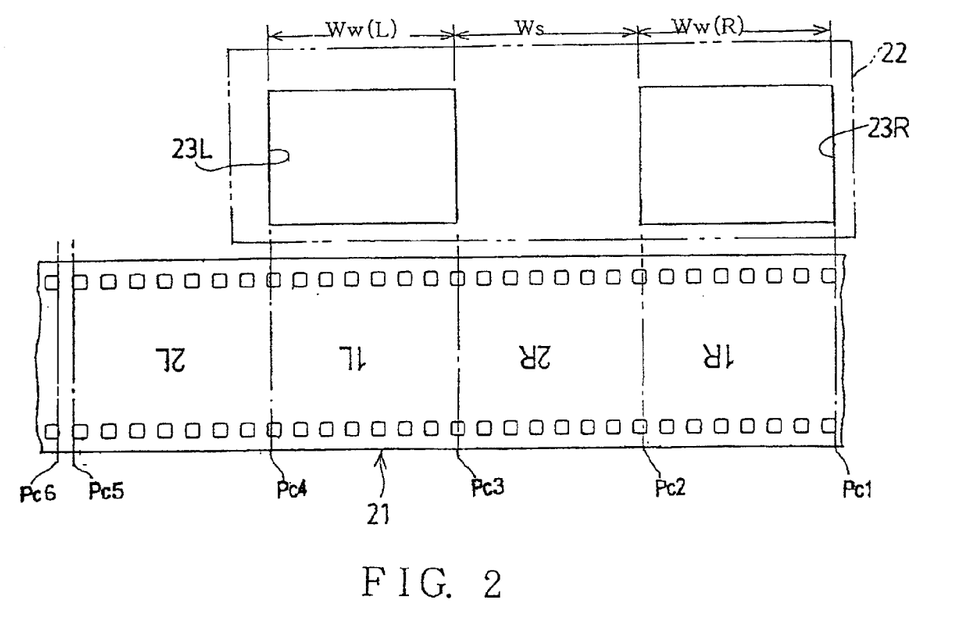
FIG. 2 is an illustration showing corresponding positions of a stereo camera and the film photographed by the stereo camera, showing one embodiment of the present invention.

FIG. 2 shows corresponding positions of the film 21 and photographing windows 23L and 23R of a stereo camera 22 for photographing the film 21. The width size of the window Ww of the left and right windows 23L and 23R of the stereo camera 22 becomes a size obtained by adding ¼ of the width of the hole opening to the width corresponding to seven perforations of the film 21. Since the perforation pitch of the 135-size film is 4.735 mm, and the width of the hole opening is 2 mm, the width size of the window Ww becomes 4.735×7+2×0.25=33.645 mm, corresponding to 33.645/4.735=7.1056 perforations. This is the same number of perforations as that corresponding to one frame. The pitch between the left and right frames (left and right photographing windows 23L and 23R of the camera) is 33.645×2=67.29 mm, and the space width Ws between the left and right windows 23L and 23R becomes Ws=67.29−33.645=33.645 mm. Moreover, the number of perforations corresponding to four frames becomes 7.1056×4=28.4224, and by adjusting the feed, the number of perforations for one group is set to 29 perforations. Therefore, the cutting plane line at the starting end of the fifth frame becomes Pc6.

Figure 3:
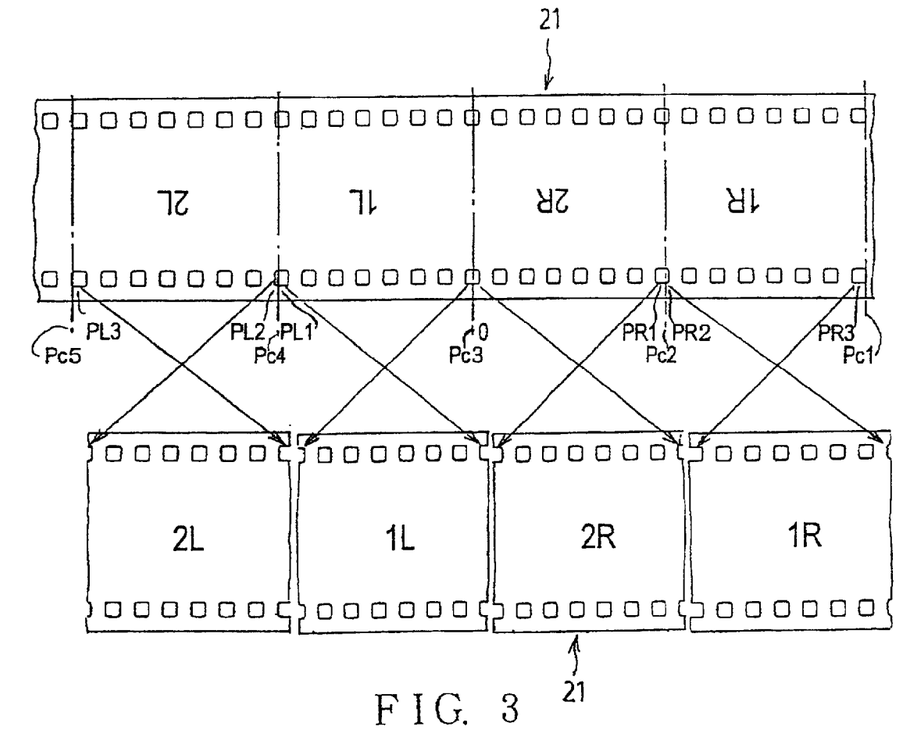
FIG. 3 shows one embodiment of the present invention, and is an elevation view of a film photographed by the stereo camera, and a film obtained by cutting and rearranging the above film.

As shown in the upper part of FIG. 3, the projection images projected on the frames 1L, 1R, 2L and 2R of the film 21 are all inverted images, and in order to enable stereoscopic vision, as shown in the lower part of FIG. 3, the film 21 is cut for each frame, rotated by 180 degrees to rearrange these images in the state of erecting images.

Figure 4:
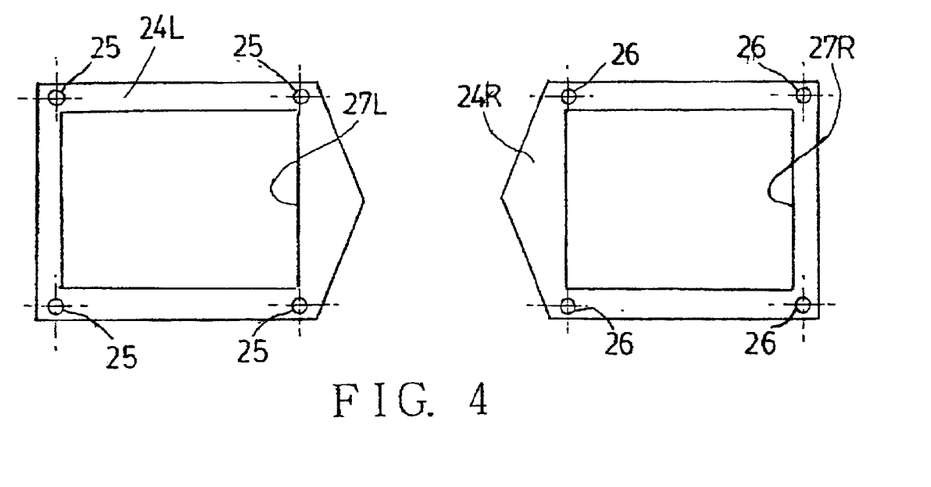
FIG. 4 is an elevation view of left and right film holders, showing one embodiment of the present invention.

Then, for example, frames 1L and 1R in the lower part of FIG. 3 are mounted to the left and right film holders 24L and 24R shown in FIG. 4. Since the hole positions, being perforations, are different in the frames 1L and 1R, the positions of pins 25 and 26 for engaging the film 21 provided in a protruding condition on the left and right film holders 24L and 24R are different between the left film holder 24L and the right film holder 24R (in FIG. 4, the positions of pins 26 are offset towards the right than the positions of pins 25.)

However, in the film 21 shown in the upper part of FIG. 3, the hole positions are respectively symmetrical at positions of the cutting line mark Pc2 and Pc4, and of the cutting line mark Pc1 and Pc5, and the cut holes 0, PL1 to PL3 and 0, PR1 to PR3 on each frame in this figure are in symmetrical positions about the cutting line mark Pc3, and hence have symmetrical shapes.

Figure 5:
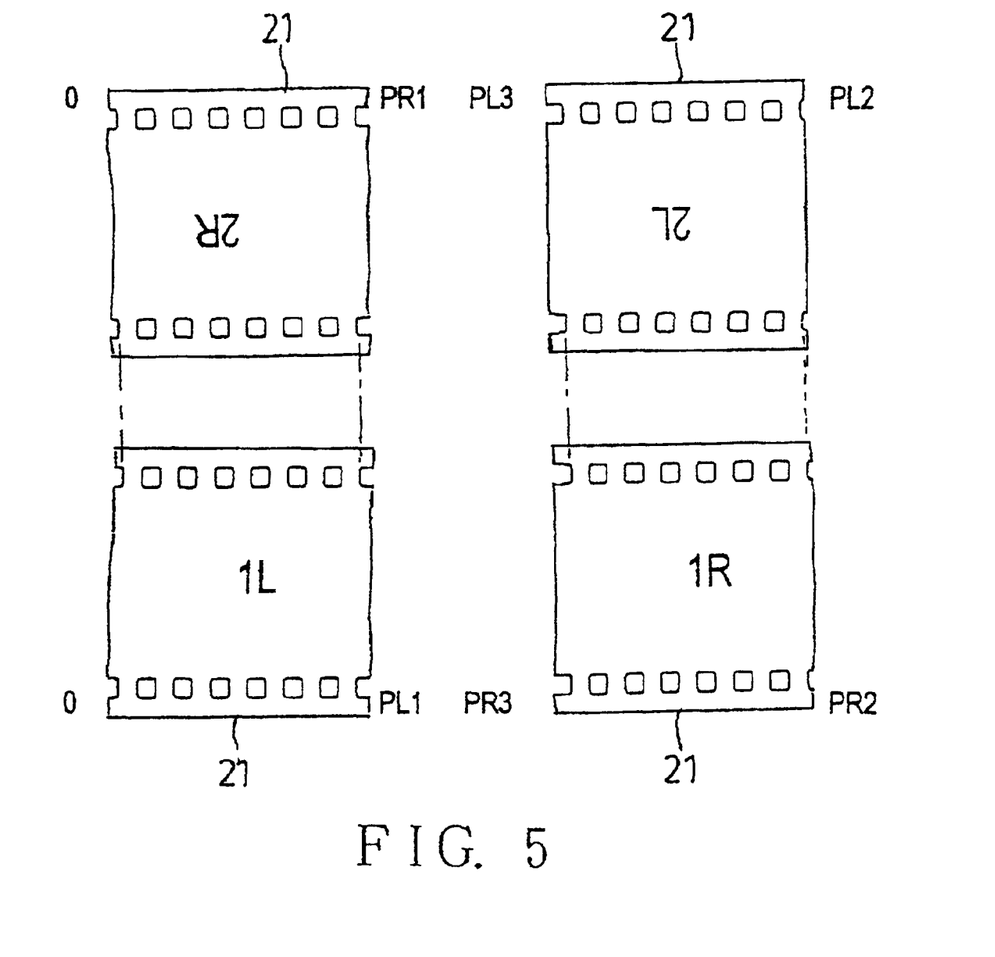
FIG. 5 is an elevation view of even number films in which the cut film in an odd number and film of an even number are arranged so as to face each other in the opposite direction, showing one embodiment of the present invention.

In FIG. 5, frames 1L and 1R of the odd set frame number shown in the lower figure and frames 2L and 2R of the even set frame number shown in the upper figure are arranged facing each other for comparison. From the above-described reason, the shape of cut holes (0, PL1, PL3, PR2) and (0, PR1, PL3, PL2) of the frames 1L and 1R in the lower figure and the frames 2L and 2R in the upper figure are the same. In this figure, if the odd number set in the lower figure is designated as a normal frame arrangement, the even number set in the upper figure is in a condition of an inverted image, and the left and right frame positions are respectively opposite. However, if the even number set in the upper figure is rotated by 180 degrees, it becomes the erecting image, and the left and right frame positions become normal. Therefore, it becomes possible to share the same film holders 24L and 24R for the films 21 in the odd number frames 1L and 1R and even number frames 2L and 2R.

However, as described above, even if it is possible to use the same film holders 24L and 24R for the films 21 in the odd number 1L and 1R and even number frames 2L and 2R, in actual use, it is difficult to identify that to which side of right and left of the film holders 24L and 24R each film 21 is mounted in which direction.

Figure 6:
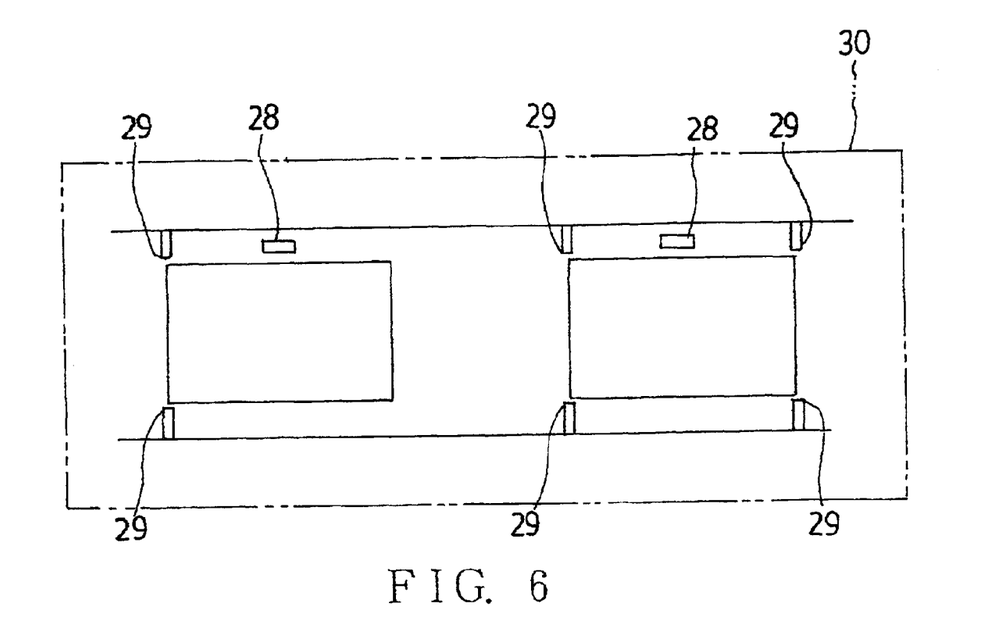
FIG. 6 is a conception diagram of a stereo camera comprising a frame number recording device and a cutting mark recording device.
Figure 7:
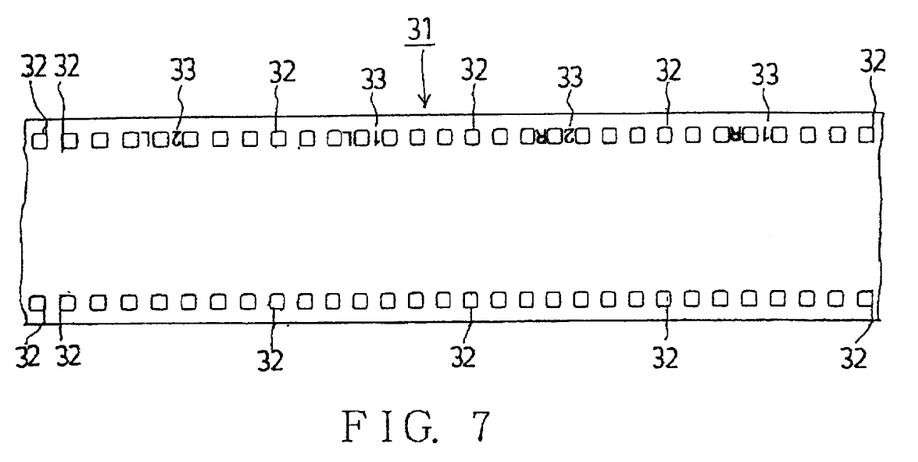
FIG. 7 is an elevation view of a film in which frame numbers and cutting marks are recorded, showing one embodiment of the present invention.

FIG. 6 shows a stereo camera 30, which has been already filed, to which the stereo frame number recording devices 28 and the cutting mark recording devices 29 are mounted, and FIG. 7 shows a film 31 photographed by this stereo camera 30.

On each frame of the film 31, cutting marks 32 are exposed and recorded at positions corresponding to the cutting line marks Pc1, Pc2, Pc3, Pc4, Pc5 and Pc6 shown in FIG. 2 by the cutting mark recording devices 29, and frame numbers 33 for stereo slides such as 1R, 2R, 1L and 2L are exposed and recorded by the frame number recording devices 28. The cutting mark recording devices 29, that is, the upper and lower cutting mark recording devices 29 at the right end shown in FIG. 6 need only to expose and record the mark when the odd frame number pictures are arranged.

Even if the perforation positions (cutting positions with respect to the perforations) arranged for each frame by the marks 32 are slightly different, as in the film 31, the cutting positions can be accurately checked visually, and hence erroneous cutting can be eliminated, and safe and accurate cutting becomes possible. Moreover, in the film 31, the frame can be identified easily by the frame numbers 33.

Figure 8:
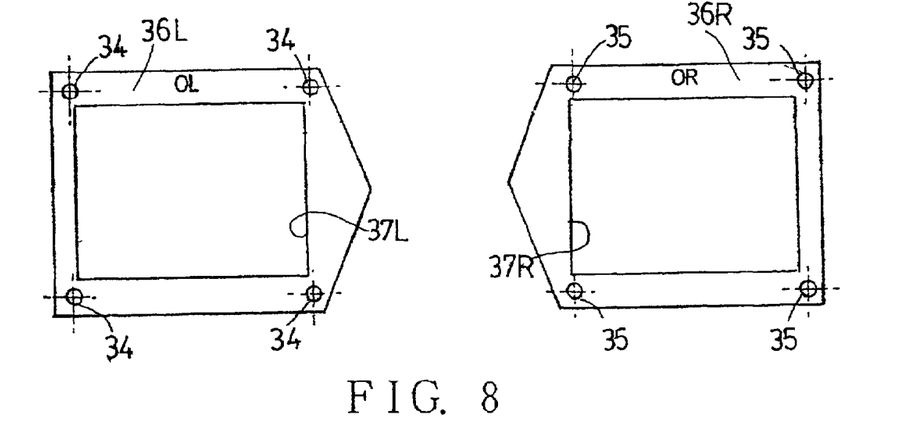
FIG. 8 is an elevation view of left and right film holders for the odd number, showing one embodiment of the present invention.

However, though the left and right film holders 24L and 24R shown in FIG. 4 can be inverted for use, as described above, since the positions of the film engaging pins 25 and 26 are symmetrical by 180 degrees for the odd number set and the even number set, identification of odd numbers and even numbers corresponding to the film to be engaged becomes necessary. For example, FIG. 8 shows a pair of left and right film holders 36L and 36R having pins 34 and 35, to which the odd number films 31 are mounted, having the same shape as that of the film holders 24L and 24R in FIG. 4, wherein an identification mark OL for displaying "left for odd number", and an identification mark OR for displaying "right for odd number" are respectively marked.

On the identification mark OL side, films of frames and frames being left in the odd number set, may be mounted, on the identification mark OR side, films of frames and frames being right in the odd number set, may be mounted. In this figure, 37L and 37R donate windows of the film holders 36L and 36R. In FIG. 4, 27L and 27R donate windows of the film holders 24L and 24R.

Figure 9:
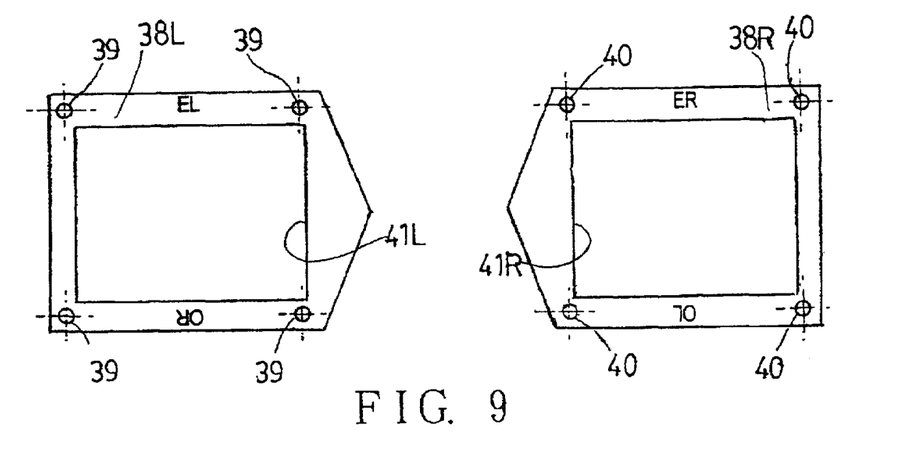
FIG. 9 is an elevation view of left and right film holders that can be shared for the even number left and right film holders and the odd number left and right film holders, showing one embodiment of the present invention.

Film holders 38L and 38R shown in FIG. 9 shows the state that the whole film holders are rotated by 180 degrees so that the film holders 36L and 36R for the odd number are inverted in the up and down direction, wherein the left and right positions of the film holders 36L and 36R are inverted, and the up and down direction thereof are also inverted (hence, the identification marks OL and OR for the odd number set are in the inverted states.

As described above, by rotating the film holders 36L and 36R by 180 degrees, the positions of the film engaging pins 34, 34 and 35, 36 are also in the opposite positions, as in the film engaging pins 39, 39 and 40, 40 shown in FIG. 9. Also, identification marks EL and ER for displaying "left or right in the even number set" are marked in the opposite direction to that of the above described odd number identification marks OL and OR. Left and right films in the odd number set may be mounted to the even number identification marks EL and ER. In this figure, reference symbols 41L and 41R denote windows in the film holders 38L and 38R.

That is to say, a pair of left and right film holders 38L and 38R is prepared, in which the positions of the film engaging pins 39, 39 and 40, 40 are different with respect to the positions of the windows 41L and 41R, and left and right identifications marks OL, OR, EL and ER for the odd number set and the even number set are given thereto. By only this operation, correspondence to four types of films having different left and right hole positions for the odd number set and the even number set becomes possible, thereby enabling use in common. As a result, the required types of the film holders can be reduced, problems such as confusion related to the combination with the film holder and arrangement can be solved, thereby making the mounting operation of the film very easy.

Figure 10:
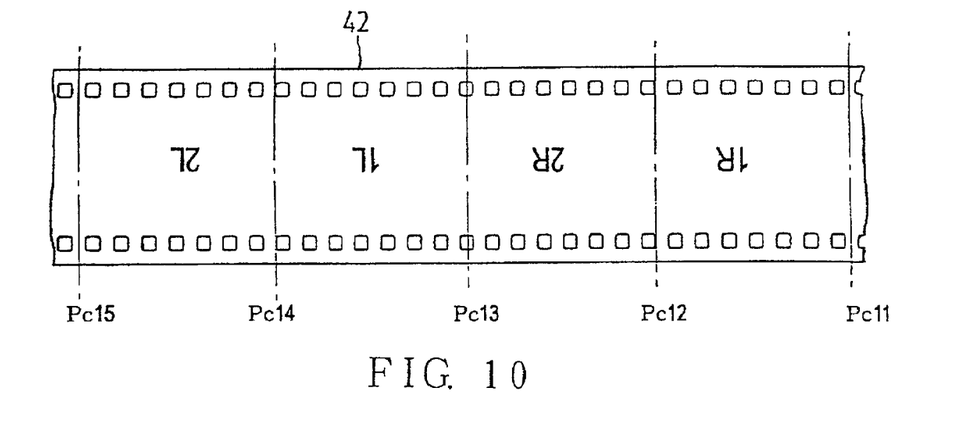
FIG. 10 shows another embodiment of the present invention, and is an elevation view of a film that is photographed by dividing the film into four, in which four frames constituting one group correspond to 29 perforations.
Figure 11:
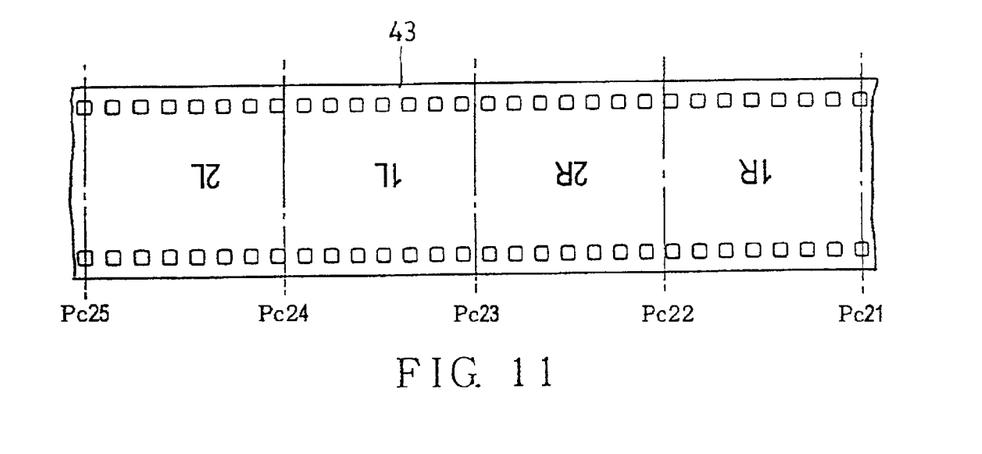
FIG. 11 shows another embodiment of the present invention, and is an elevation view of a film that is photographed by dividing the film into four, in which four frames constituting one group correspond to 29 perforations.

Films 42 and 43 shown in FIG. 10 and FIG. 11 show other embodiments different from the picture frame arrangement of the film (film 21 in FIG. 1, and film 31 in FIG. 7), wherein the width of one frame equals to one fourth of the film corresponding to 29 holes, to thereby extend the frame width up to the maximum limit, and four frames constitute one group.

As described above, in order to make it possible to share the film holder for the odd number set and the film holder for the even number set, in the film 42, a center cutting line mark Pc13 in the four frames constituting one group is positioned at the center of a perforation and cutting line marks Pc11, Pc12, Pc14, and Pc15, and in the film 43, a center cutting line mark Pc23 in the four frames constituting one group is positioned in the middle of a perforation and cutting line marks Pc21, Pc22, Pc24, and Pc25, so that positions of perforations become symmetrical between left and right frames.

The film cutting length corresponding to one frame of the films 42 and 43 becomes 4.735×29/4=34.32875 mm. In either case of the films 42 and 43, it is not possible to arranged an open hole at the opposite ends of the cut film, but since the 135-size film has many perforations at equal intervals, pins may be provided at a position corresponding to the film holder so that perforations other than at the opposite ends can be used for engagement.

Figure 12:
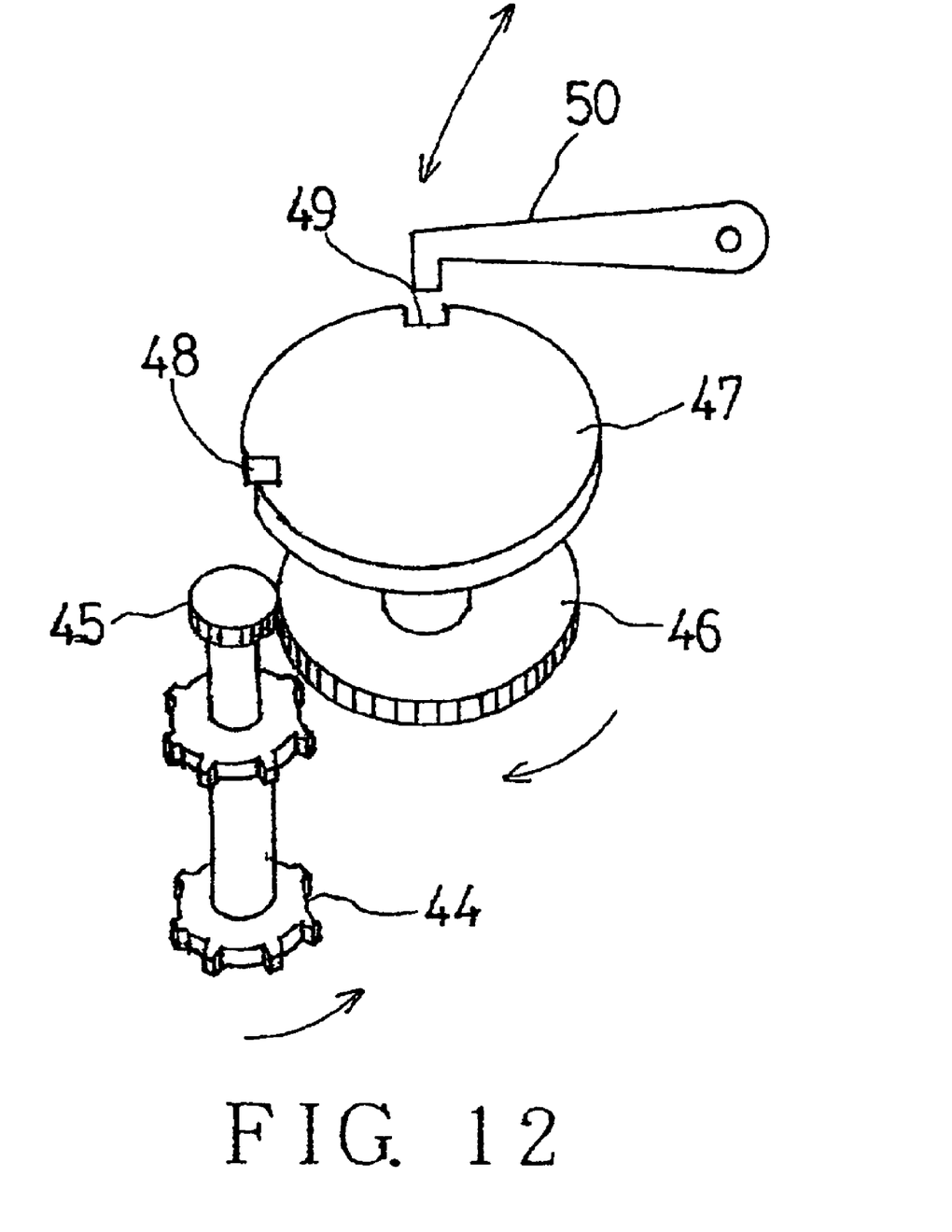
FIG. 12 is a conception diagram of a film feed mechanism of the stereo camera.

Moreover, as the film feed mechanism of the stereo camera for photographing in the picture frame array of the films 21, 31, 42 and 43, a conventional mechanism is applicable. FIG. 12 is a conception diagram of a conventional type film feed mechanism (detailed description of a rotation stopper section is omitted), wherein each film is fed by making perforations of the film mesh with a film feed sprocket wheel 44 shown in the figure.

A pinion 45 is connected to the shaft of the sprocket wheel 44, and meshed with a gear 46. A rotation stopper 47 is attached to the shaft of the gear 46. The rotation stopper 47 has two grooves 48 and 49 on the circumference thereof, and the film is positioned at a predetermined stop position by regulating the grooves 48 and 49 by a stop lever 50. When the rotation stopper 47 rotates once, the film is fed by 29 perforations, which is one group containing four frames.

In this case, if the number of teeth of the sprocket wheel 44 is designated as Ns, the number of teeth of the pinion 45 is designated as n, and the number of teeth of the gear is designated as N, the relation between the number of teeth of the sprocket wheel 44, the number of teeth of the pinion 45 and the number of teeth of the gear 46 becomes:

$$n/N = Ns/29.$$

Figure 13:
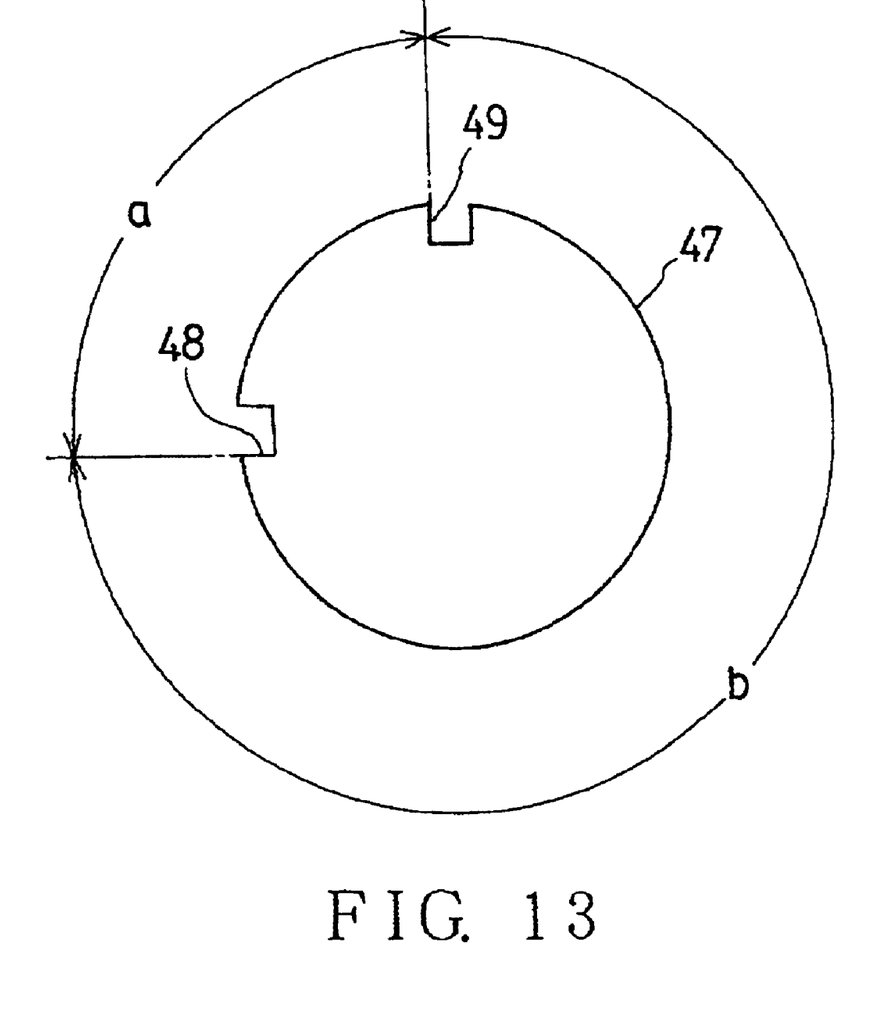
FIG. 13 is a diagram of a rotary stopper.

As shown in FIG. 13, when the rotary stopper 47 rotates once, the film is fed by 29 perforations. Therefore, a ratio of a rotation angle a to a rotation angle b between the stopper grooves 48 and 49 is set in an equal ratio of a film feed rate after photographing odd number screens to a film feed rate after photographing even number frames.

Furthermore, as the film feed apparatus practically used at present, other than the above gear method, there is a method in which a film is wound up by a drum driven by an electric motor, and perforations of the film are calculated (measured) by an infrared radiation sensor for stopping and positioning the film. This method may be also used. In this case, alternate feeding of one frame and three frames is performed in such a manner that a perforation counter is made to be an alternate feed program, and sensors are installed in two places, since the hole position at the time of stopping the film in the case of feeding one frame is different from the hole position at the time of stopping the film in the case of feeding three frames. However, if an image sensor such as an infrared linear sensor is used, the stop position for each feed of the film can be freely set, and can be also freely changed and finely adjusted. Moreover, feed rate control immediately before stopping the film (slowing down of the feed rate immediately before stopping) can be also freely set.

The present invention can be variously modified without departing from the scope of the present invention, and needless to say, the present invention covers those modifications.

What is claimed is:

1. A stereo camera for photographing a pair of left and right stereo pictures in a first frame and a third frame of a continuous film having a plurality of perforations, a first portion of the plurality of perforations in a first position relative to the first frame and a third portion of the plurality of perforations in a third position relative to the third frame, photographing a next pair of left and right stereo pictures in a second frame and a fourth frame thereof having a second portion of the plurality of perforations in a second position relative to the second frame and a second portion of the plurality of perforations in a fourth position relative to the fourth frame, the first and fourth positions being different than the second and third positions relative to a respective frame, and repeating similar photographing, wherein perforation positions of the first position of the first frame and of the fourth position of the fourth frame are arranged so as to be symmetrical about a center in the longitudinal direction of the first frame to the fourth frame as a center of symmetry for performing photographing.

2. A stereo camera for photographing a pair of left and right stereo pictures as in claim 1, as well as a mark being recorded for cutting the continuous film at a boundary position between respective frames of the continuous film by a mark recording device.

3. A stereo camera for photographing a pair of left and right stereo pictures as in claim 1, as well as a frame number for stereo slides being recorded in each frame of the continuous film by a number recording device.

4. A stereo camera for photographing a pair of left and right stereo pictures as in claim 1, as well as a mark being recorded for cutting the continuous film at a boundary position between respective frames of the continuous film by a mark recording device, and a frame number for stereo slides being recorded in each frame of the continuous film by a number recorded device.

5. A stereo slide mount in which a pair of left and right film holders is slidably fitted together between a base frame and a cover frame, each having left and right windows placed in juxtaposition with each other therein, wherein an identification mark for identifying an odd number set and an even number set of film frame numbers is attached to said film holder, and left and right thereof are selectively given to said pair of left and right film holders.

6. A stereo slide mount in which a pair of left and right film holders is slidably fitted together between a base frame and a cover frame, each having left and right windows placed in juxtaposition with each other therein, wherein a pin to be engaged with perforations of a film in which odd number stereo pictures are photographed is provided in said left and right film holders to thereby prepare left and right film holders for an odd number set, or a pin to be engaged with the perforations of the film in which even number stereo pictures are photographed is provided in said left and right film holders to thereby prepare left and right film holders for an even number set, corresponding to a stereo slide film for photographing a pair of left and right stereo pictures of the odd number in a first frame and a third frame of a continuous film, photographing a pair of left and right stereo pictures of the even number is photographed in a second frame and a fourth frame thereof, and repeating similar photographing, in which the perforation positions of said first frame to said fourth frame are arranged so as to be symmetrical about the center in the longitudinal direction of said first frame to said fourth frame as the center of symmetry, so that said left and right film holders for the odd number set and said left and right film holders for the even number set, respectively provided with said pin, are in a rotational symmetry at 180 degrees, and freely shared.

7. A stereo camera for photographing pairs of left and right stereo pictures comprising:

a pair of photographing windows within the stereo camera spaced a space width apart, each of said pair of photographing windows having a window width; and a film, when exposed comprising a group of four frames having a plurality of perforations along an edge of each frame with a pitch less than a width of one of the four frames, each of the plurality of perforations having a hole width, said film positioned adjacent said pair of photographing windows, whereby a number of perforations extend along an edge of each frame of the group of four frames, the group of four frames comprising a first pair of left and right stereo pictures and a second pair of left and right stereo pictures when developed, wherein a center of symmetry relative to said plurality of perforations separates the right stereo pictures of the first and second pair of left and right stereo pictures and the left stereo pictures of the first and second pair of left and right stereo pictures and a first perforation position is common to the left stereo picture of the first pair of left and right stereo pictures and the right stereo picture of the second pair of left and right stereo pictures and a second perforation position is common to the right stereo picture of the first pair of left and right stereo pictures and the left stereo picture of the second pair of left and right stereo pictures, wherein the first and second perforation positions are different, whereby two different perforation positions are obtained for the group of four frames facilitating mounting of the pairs of left and right stereo pictures.

8. A stereo camera for photographing pairs of left and right stereo pictures as in claim 7 further comprising:

a cutting mark recording devise positioned adjacent the plurality of perforations along an edge.

9. A stereo camera for photographing pairs of left and right stereo pictures as in claim 7 further comprising:

a frame number recording devise positioned adjacent the plurality of perforations along an edge.

10. A stereo camera for photographing pairs of left and right stereo pictures as in claim 7 wherein:

the number of perforations extending along an edge of each frame of the group of four frames is at least seven.

11. A stereo camera for photographing pairs of left and right stereo pictures as in claim 7 wherein:

the number of perforations extending along an edge of the group of four frames is twenty-nine.

12. A stereo camera for photographing pairs of left and right stereo pictures as in claim 7 wherein:

the window width is equal to the number of perforations extending along an edge of each frame multiplied by the pitch plus the hole width times one-quarter.

13. A stereo camera for photographing pairs of left and right stereo pictures as in claim 7 wherein:

the window width is substantially equal to 33.645 mm.

14. A stereo camera for photographing pairs of left and right stereo pictures as in claim 7 wherein:

the space width is substantially equal to 33.645 mm.

15. A stereo slide mounting system for mounting a pair of left and right stereo pictures comprising:

a group of four frames cut from a film having a plurality of perforations along an edge of each frame with a pitch less than a width of one frame of said group of four frames, each of the plurality of perforations having a hole width, whereby a number of perforations extend along an edge of each frame of said group of four frames, said group of four frames comprising a first pair of left and right stereo pictures and a second pair of left and right stereo pictures, wherein a center of symmetry of the film relative to said plurality of perforations separates the right stereo pictures of the first and second pair of left and right stereo pictures and the left stereo pictures of the first and second pair of left and right stereo pictures and a first perforation position is common to the left stereo picture of the first pair of left and right stereo pictures and the right stereo picture of the second pair of left and right stereo pictures and a second perforation position is common to the right stereo picture of the first pair of left and right stereo pictures and the left stereo picture of the second pair of left and right stereo pictures, wherein the first and second perforation positions are different;

a first film holder;

a first plurality of pins positioned on said first film holder adapted to mate with the first perforation position;

a second film holder; and a second plurality of pins positioned on said second film holder adapted to mate with the second perforation position, whereby only two different film holders are needed for positioning said group of four frames in the pair of left and right stereo pictures.

16. A stereo slide mounting system for mounting a pair of left and right stereo pictures as in claim 15 wherein:

the number of perforations extending along an edge of each frame of the group of four frames is at least seven.

17. A stereo slide mounting system for mounting a pair of left and right stereo pictures as in claim 15 wherein:

the number of perforations extending along an edge of the group of four frames is twenty-nine.

18. A stereo slide mounting system for mounting a pair of left and right stereo pictures as in claim 15 further comprising:

a stereo slide mount adapted to hold said first and second film holders, whereby one of the pair of left and right stereo pictures is formed.

19. A method of photographing and mounting a pair of left and right stereo pictures with a stereo camera comprising the steps of:

exposing a group of four frames forming a first and second pair of left and right stereo pictures on a film having a plurality of perforations along an edge of each frame with a pitch less than a width of one of the four frames, each of the plurality of perforations having a hole width, whereby a number of perforations extend along an edge of each frame of the group of four frames, wherein a center of symmetry of the film relative to said plurality of perforations separates the right stereo pictures of the first and second pair of left and right stereo pictures and the left stereo pictures of the first and second pair of left and right stereo pictures and a first perforation position is common to the left stereo picture of the first pair of left and right stereo pictures and the right stereo picture of the second pair of left and right stereo pictures and a second perforation position is common to the right stereo picture of the first pair of left and right stereo pictures and the left stereo picture of the second pair of left and right stereo pictures, wherein the first and second perforation positions are different;

cutting the group of four frames along the center of symmetry and between the right stereo pictures of the first and second pair of left and right stereo pictures and between the left stereo pictures of the first and second pair of left and right stereo pictures, whereby the left stereo picture of the first pair of left and right stereo pictures and the right stereo picture of the second pair of left and right stereo pictures have the first perforation position and the right stereo picture of the first pair of left and right stereo pictures and the left stereo picture of the second pair of left and right stereo pictures have the second perforation position;

placing the left stereo picture of the first pair of left and right stereo pictures and the right stereo picture of the second pair of left and right stereo pictures on first film holders having a first pin position adapted to mate with the first perforation position;

placing the right stereo picture of the first pair of left and right stereo pictures and the left stereo picture of the second pair of left and right stereo pictures on second film holders having a second pin position adapted to mate with the second perforation position;

mounting one pair of the first and second film holders on a first stereo slide mount forming one of the pair of left and right stereo pictures; and mounting another pair of the first and second film holders on a second stereo slide mount forming another one of the pair of left and right stereo pictures, whereby only two different film holders are needed for positioning said group of four frames in the pair of left and right stereo pictures.

\* \* \* \* \*